Patented Aug. 23, 1932

1,873,799

UNITED STATES PATENT OFFICE

FERNAND VACHER, OF PARIS, FRANCE, ASSIGNOR, BY MESNE ASSIGNMENTS, TO CONTINENTAL-DIAMOND FIBRE COMPANY, OF NEWARK, DELAWARE, A CORPORATION OF DELAWARE

SYNTHETIC RESIN AND METHOD OF MAKING SAME

No Drawing. Application filed December 16, 1926. Serial No. 155,350.

My invention relates to a new synthetic resin and to a new and improved process of making the same.

One object of my invention is to provide a new and improved potentially reactive synthetic resin which can be used as a molding powder or dissolved in an organic solvent and used as a varnish per se or in the preparation of laminated materials, or which due to its inherent properties may be used for impregnating purposes when in a fluid condition without dilution in a solvent.

Another object of my invention is to provide a synthetic resin which will be especially applicable for electrical purposes since it has high dielectric properties, superior to those of the synthetic resins now used.

A further object is to provide a chemically resistant synthetic resin which will not only be inert and insoluble towards acids and organic solvents but which will be also insoluble in and unacted upon by alkalis.

Still another object is to provide a synthetic resin which will have a high finish and tensile strength as well as hardness and durability. Other objects will be apparent from a consideration of the specification and claims.

My invention contemplates new and improved methods of preparing synthetic resins, with improved properties, of the aldehyde-amine class. The term "aldehyde" embraces both aliphatic and aromatic aldehydes, a typical example being formaldehyde. The term "amine" also includes both aromatic and aliphatic amines and also primary, secondary and tertiary amines and aniline may be given as an example.

The resin is made in two stages—the first known as the potentially reactive stage or the initial condensation product, and the second the final reacted stage or the infusible, insoluble resin.

The success of my invention may be attributed in part at least to the treatment of the first reaction product which treatment removes the water and the unreacted or partially reacted components. This treatment is a distillation step carried out under a partial vacuum and at an elevated temperature until no further distillate at the elevated temperature is obtained. Since the partial vacuum and the temperature to which the first product of reaction is to be heated are dependent upon each other they may be varied considerably. I have obtained excellent results by the distillation of the initial compound under a partial vacuum of 500 mm. with the continued distillation until the temperature reaches 150° C. The residue or the product remaining in the apparatus is the initial condensation product, while the distillate which comprises the unreacted or only partially reacted original components may be used in the next run.

The potentially reactive compound is soluble in organic solvents and while usually in the form of a solid has a relatively low melting point and may be melted to give a liquid having approximately the viscosity of water. This property is particularly of value since in impregnating work no dilution with organic solvents is necessary. It will be obvious, therefore, that a great saving results since there is no solvent cost involved and no difficulty encountered with the somewhat hazardous solvent recovery systems used at the present time in such work. Continued heating under pressure will convert the initial condensation product into the final product that is to say the hard, infusible, insoluble resin. In this second stage, a resin is obtained which is not only insoluble in acids and organic solvents but which is also unacted upon by alkalis. This latter property is peculiar to the resin of this invention since all the resins now used while insoluble in acids and organic solvents are soluble in or attacked by alkalis. It will be obvious that this resin will find applicability in many new uses where alkalis are present, which uses have not been possible heretofore with the known resins. The final infusible, insoluble product has also a remarkably high dielectric strength superior to that of the widely used phenolic resins. The final product is also characterized by a high finish, high tensile strength, and wear-resisting qualities.

In a typical case, 100 gms. of aniline are mixed with 90 gms. of 40% formaldehyde solution and are heated together under a reflux condenser until a reaction takes place, probably the formation of anhydroformaldehydeaniline, which reaction usually takes place in one half hour. The whole mix is then placed under a partial vacuum of 500 mm. and distilled until the temperature reaches 150°. The potentially reactive resin at room temperature is a solid but is easily fusible and melts from 50° C. to 80° C. to give a liquid of approximately the viscosity of water. As hereinabove pointed out, this resin may be used per se in a liquid condition to impregnate materials or it may be mixed with fillers or other compounds and used as a molding powder or it may be dissolved in an organic solvent and used as a varnish per se or as a varnish in the production of laminated materials. Regardless of the particular use, the potentially reactive resin when heated to a relatively high temperature usually above 170° C. is converted into the infusible, insoluble resin. This step is usually accomplished by treatment under hydraulic pressure in order that the finished product may be in a molded form or may have a finished surface as is the case in the preparation of laminated or sheet materials.

The initial reaction between the amine and the aldehyde may be accelerated by the use of certain other compounds known as catalysts among which are acids and bases and certain salts. As part of this invention, I have found that the reaction is materially hastened and the properties of the resulting product substantially improved if the reaction is carried out in the presence of a phenol, particularly cresol. When the proportions of aniline and formaldehyde given in the typical example are used, the rate of reaction and the desirable qualities of the gum are greatly enhanced by the addition in the original mix of 20 to 25 gms. of cresol. However, much larger proportions of the cresol may be added and the figure of 20 to 25 gms. is given merely by way of example and the exact amount of phenolic body used will depend upon the conditions of operation and upon the properties desired in the final product. In all cases, however, the amount of the phenol added is less than that amount which would prevent the main reaction of the process being a reaction between the amine and the aldehyde.

The length of time and the temperature required to convert the fusible resin into the final stage may be materially reduced if a hardening agent is added. This hardening agent is usually present, when used, in percentages less than ten per cent. the exact amount depending on the conditions of operation. The term "hardening agent" is well understood in the art and any one of a number of compounds may be used such, for example, as hexamethylenetetramine. The addition of the hardening agent will not in any way detract from the desirable properties of the final resin, but will rather improve them.

Considerable modification in the methods of preparation of the material and in the proportions used and in the methods of using the same are possible with no departure from the essential features of my invention.

I claim:

1. The process of making a synthetic resin which comprises reacting together approximately 100 parts of aniline and approximately 90 parts of 40% formaldehyde solution in the presence of approximately 25 parts of a phenol to form a potentially reactive resin; and thereafter heating said potentially reactive product to obtain a hard, infusible, insoluble resin.

2. The process of making a synthetic resin which comprises reacting together approximately 100 parts of aniline and approximately 90 parts of 40% formaldehyde solution in the presence of approximately 20 to 25 parts of a phenol; distilling the first reaction product under a partial vacuum to obtain a potentially reactive resin free from the unreacted components; and thereafter heating said potentially reactive product to obtain a hard, infusible, insoluble resin.

3. A hard, infusible, insoluble synthetic resin obtained by further heating the initial condensation product resulting from the reaction of approximately 100 parts of aniline and approximately 90 parts of 40% formaldehyde solution in the presence of approximately 20 to 25 parts of a phenol.

FERNAND VACHER.